United States Patent [19]

Zittel

[11] Patent Number: 4,875,344
[45] Date of Patent: Oct. 24, 1989

[54] CHILLER

[75] Inventor: David R. Zittel, Columbus, Wis.

[73] Assignee: Lyco Manufacturing, Inc., Columbus, Wis.

[21] Appl. No.: 297,703

[22] Filed: Jan. 17, 1989

[51] Int. Cl.$^4$ ............................................. F25D 25/02
[52] U.S. Cl. ..................................... 62/381; 366/319
[58] Field of Search ........................... 62/381; 366/319

[56] References Cited

U.S. PATENT DOCUMENTS

| | | | |
|---|---|---|---|
| 2,794,326 | 6/1957 | Mencacci | 62/104 |
| 2,942,429 | 1/1960 | Van Dolah et al. | 62/64 |
| 3,015,219 | 1/1962 | Veyrie | 62/381 |
| 3,092,975 | 6/1963 | Zebarth | 62/63 |
| 3,097,501 | 7/1963 | Pappas | 62/63 |
| 3,213,634 | 10/1965 | Granata | 62/63 |
| 3,395,549 | 8/1968 | Grimes | 62/63 |
| 3,410,101 | 11/1968 | Morris | 62/63 |
| 3,426,546 | 2/1969 | Crane | 62/63 |
| 3,446,030 | 5/1969 | Rubin | 62/63 |
| 3,488,973 | 1/1970 | Harben, Jr. et al. | 62/63 |
| 3,498,208 | 3/1970 | Longe et al. | 62/63 |
| 3,555,838 | 1/1971 | Morris, Jr. | 62/63 |
| 3,623,331 | 11/1971 | Buyens | 62/63 |
| 3,906,743 | 9/1975 | Schorsch et al. | 62/374 |
| 3,992,899 | 11/1976 | Spahn | 62/374 |
| 4,022,600 | 5/1977 | Mutoh et al. | 62/381 |
| 4,569,204 | 2/1986 | Ott et al. | 62/381 |
| 4,577,466 | 3/1986 | Cunningham | 62/63 |
| 4,578,957 | 4/1986 | Cunningham | 62/63 |
| 4,697,508 | 10/1987 | Tallafus | 62/381 |
| 4,700,546 | 10/1987 | Mattson | 62/381 |

OTHER PUBLICATIONS

Lyco Manufacturing, Inc. information sheet on Model 955A Counter Flow Cooler with attached letters and blue print copy.

*Primary Examiner*—Ronald C. Capossela
*Attorney, Agent, or Firm*—Lathrop & Clark

[57] ABSTRACT

A chiller which subjects a food product flow to a continuous controlled cooling treatment with water includes a tank with an inlet end and a discharge end, an auger having flights mounted rotatably within the tank, a perforate cylinder mounted within the tank around the auger to substantially contain the auger and food product while allowing water within the tank to pass in and out of the cylinder, and a plurality of baffles which each extend substantially radially inwardly from the perforate cylinder between two adjacent flights of the auger. When the auger and cylinder rotate, the baffles agitate the water and food product by carrying the food product sidewardly and upwardly out of the water, and then allow the food product to tumble back into the water. Additionally, the chiller preferably include two air manifolds mounted within the tank below the intended water level 42 outside the cylinder along its entire length. The air manifolds are positioned to agitate the food product and water within the perforate cylinder and to create a circulation of water between the perforate cylinder and tank so that the warmer water within the cylinder is constantly being replaced and cooled. The food product and cooling water preferably flow in generally opposite directions, thereby allowing an efficient heat exchange between the food product and water.

14 Claims, 3 Drawing Sheets

CHILLER

BACKGROUND OF THE INVENTION

1. Field of the Invention

The present invention relates to chillers and apparatus used for cooling loose food products or bagged food products. More specifically the present invention relates to chillers of considerable size which utilize water to cool a continuous food product flow.

2. Description of the Related Art

Chilling machines which utilize water to cool a continuous food product flow are well known. Food products are commonly moved through cylindrical cooling containers using helical conveyor screws. Products which are so moved through a container typically are gently pushed by the flights of the conveyor screw longitudinally through the lower portion of the container with little lateral movement. Thus if the container is partially filled with water for cooling the food product, the food product will often lie in relatively stable relation to the water with limited mixing. The heat exchange from the product to the water under such conditions is also limited, which in turn affects the capacity of the machine to cool the food product. Such limitation of the heat exchange rate has also limited the size and capacity of such machines, since larger machines will result in a greater mass of food product to be cooled by the cooling water, thereby creating additional efficiency problems. U.S. Pat. Nos. 3,097,501 and 3,410,101 illustrate such chillers in which animal carcasses are agitated by pressurized air blown into the apparatus, and in U.S. Pat. No. 3,410,101 axial rods at the flight perimeter and trailing lifting fingers provide further agitation. In U.S. Pat. No. 4,578,957, a packing plant by-products chiller is disclosed, having a long, inclined baffled rotating tank in which the by-products are cooled by a liquid coolant which is sprayed onto the by-product through spray nozzles on header lines. However, the tank contains no screw conveyor. Instead, the introduction of additional by-products and coolant, and gravity, pushes the previously introduced by-products through the tank.

Continuous chillers commonly require lengthy tank-like structures to sufficiently cool the food product being processed in the capacities required for commercial continuous food processing. The cooling process often takes as long as about 30 minutes to complete, despite improvements which have been made in the equipment. In many such chillers, cold water is added to the food product at several locations within the long tank. This often increases the quantities of water required for cooling, which may be both inefficient and increase plant waste water disposal problems. In particular, at the infeed end of many tanks, the temperature differential between the cold water and food product is particularly large since the food product is warm, while at the discharge end, the differential is particularly small because by the time the food product reaches the discharge end, it is fairly cool. It is known that counter-flow cooling, wherein the cooling water traverses the cooling tank in a direction opposite to that of the product, maintains a more uniform temperature differential and better heat transfer between the product and the cooling water throughout the length of the tank. U.S. Pat. No. 3,426,546 to Crane discloses removing water at the discharge end of the chiller tank, cooling the water with ice and then adding varying amounts of the cooled water to the chiller at different locations along the length of the tank.

Despite the many variations of continuous cooling apparatus which have been employed in food processing, a need has continued for a continuous cooler which will cool a greater volume of product in less time and a shorter physical length of equipment and plant floor space, while attaining maximum efficient use of cooling water.

SUMMARY OF THE INVENTION

The present invention is summarized in that a chiller which subjects a food product flow to a chilling treatment with cool water, includes a tank with an inlet end and a discharge end, an auger having flights mounted rotatably within the tank, a perforate cylinder mounted within the tank around the auger to substantially contain the auger and food product, and a plurality of lifting baffles of which each extends substantially radially inwardly from the perforate cylinder between two adjacent flights of the auger. The diameter of the flights of the auger are about equal to the inside diameter of the cylinder. The cylinder is perforate so that water contained within the tank is allowed to pass in and out of the cylinder, since the cylinder is partially immersed within water in the tank. The cylinder has an inlet opening near the inlet end of the tank for receiving food introduced into the chiller and an outlet opening near the discharge end of the tank. As the auger rotates, its flights drive the food product through the cylinder out the outlet opening. Each baffle which is located between two adjacent flights agitates the water and food product by carrying the food product sidewardly through the water and upwardly out of the water as the auger and cylinder rotate. Eventually the food product tumbles from each baffle back into the water as the baffle continues to move upwardly.

Preferably the chiller also includes first and second air manifolds mounted within the tank below the intended water level outside the cylinder, along the entire length of the cylinder. The first air manifold has orifices through which air is directed toward the cylinder so that colder water within the tank outside the cylinder is driven into the cylinder. The second air manifold has orifices through which air is directed toward the first air manifold so that warmer water which has exited the cylinder is cooled by being driven toward the first manifold through colder water in the tank beneath the cylinder. The two air manifolds therefore cause a circulation of cooling water between the tank and the cylinder. Preferably the cylinder and auger both have a diameter of about 72 inches, for optimum cooling capacity.

A primary object of the invention is to provide a chiller with a rotating cylinder and auger in which baffles are positioned between adjacent flights of the auger to agitate and mix the food product and water within the cylinder.

A further object of the invention is to provide a chiller with a rotating perforated cylinder through which pressurized air is blown to drive colder water outside the cylinder into the cylinder, and to drive warmer water which has exited the cylinder through colder water outside of the cylinder, thereby cooling the water within the cylinder by causing a circulation of cooling water between the tank and cylinder.

Another object of the invention is to provide a chiller in which cold water is introduced into the discharge end of the chiller and is removed at the inlet end thereof so that the food product and cooling water are flowing generally in opposite directions, thereby taking advantage of the heat exchanging efficiency caused by a counter-flow of product and water.

An additional object of the invention is to provide a chiller with a rotating cylinder and auger which both have diameters which allow for the most efficient and effective cooling of the food product therein.

Other objects, features and advantages of the invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
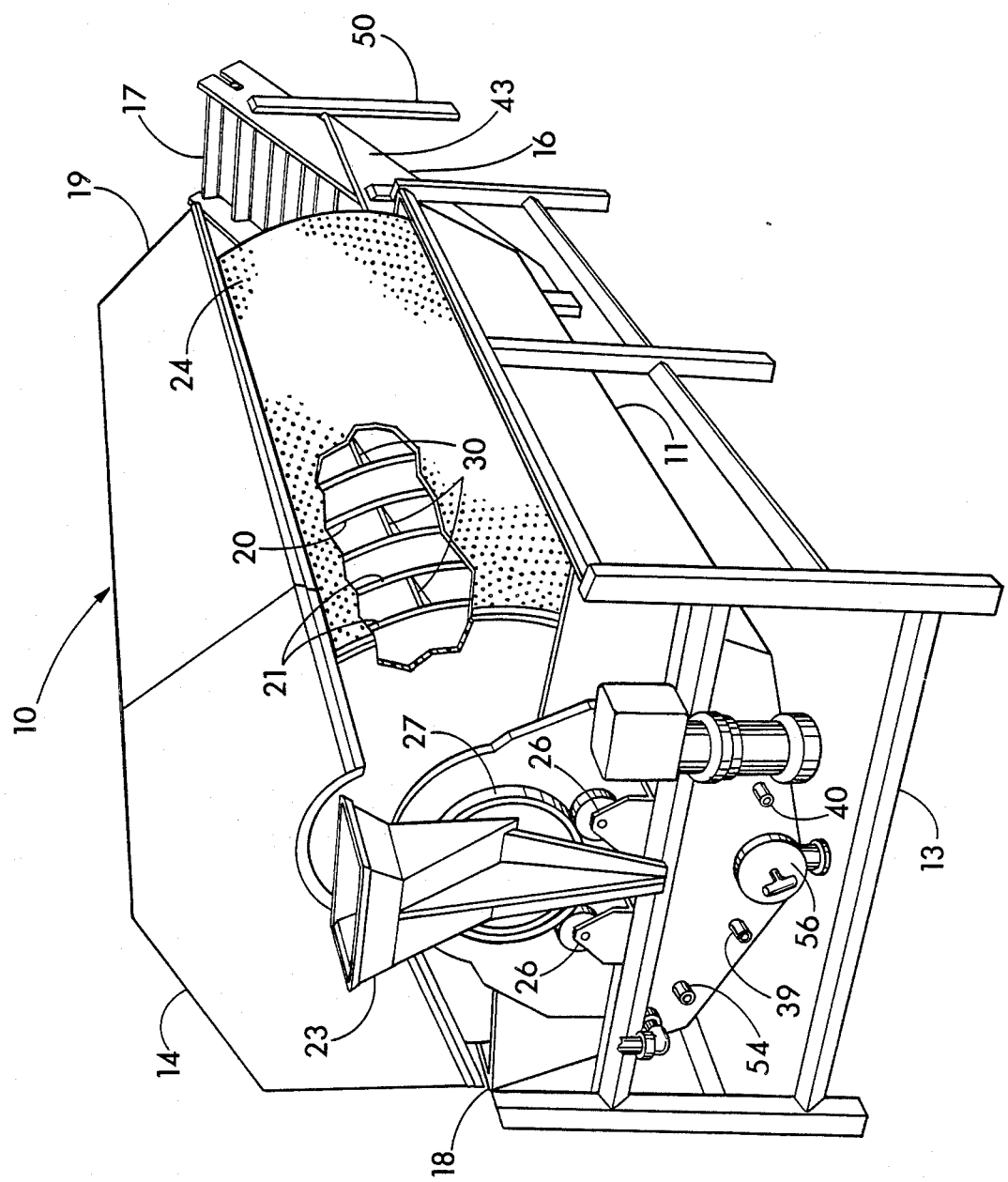
FIG. 1 is a perspective view of the chiller of the invention with the right side of the cover partially open, exposing the perforate cylinder which is partially cut away to show the auger and baffles.

Referring more particularly to the drawings, wherein like numbers refer to like parts, FIG. 1 shows a chiller 10 having an elongated open top tank 11 supported by a frame 13, an elongated vaulted cover 14 adapted to fit over the tank 11, an inlet end 18 and a outlet tank 16 with inclined conveyor 17.

Figure 2:
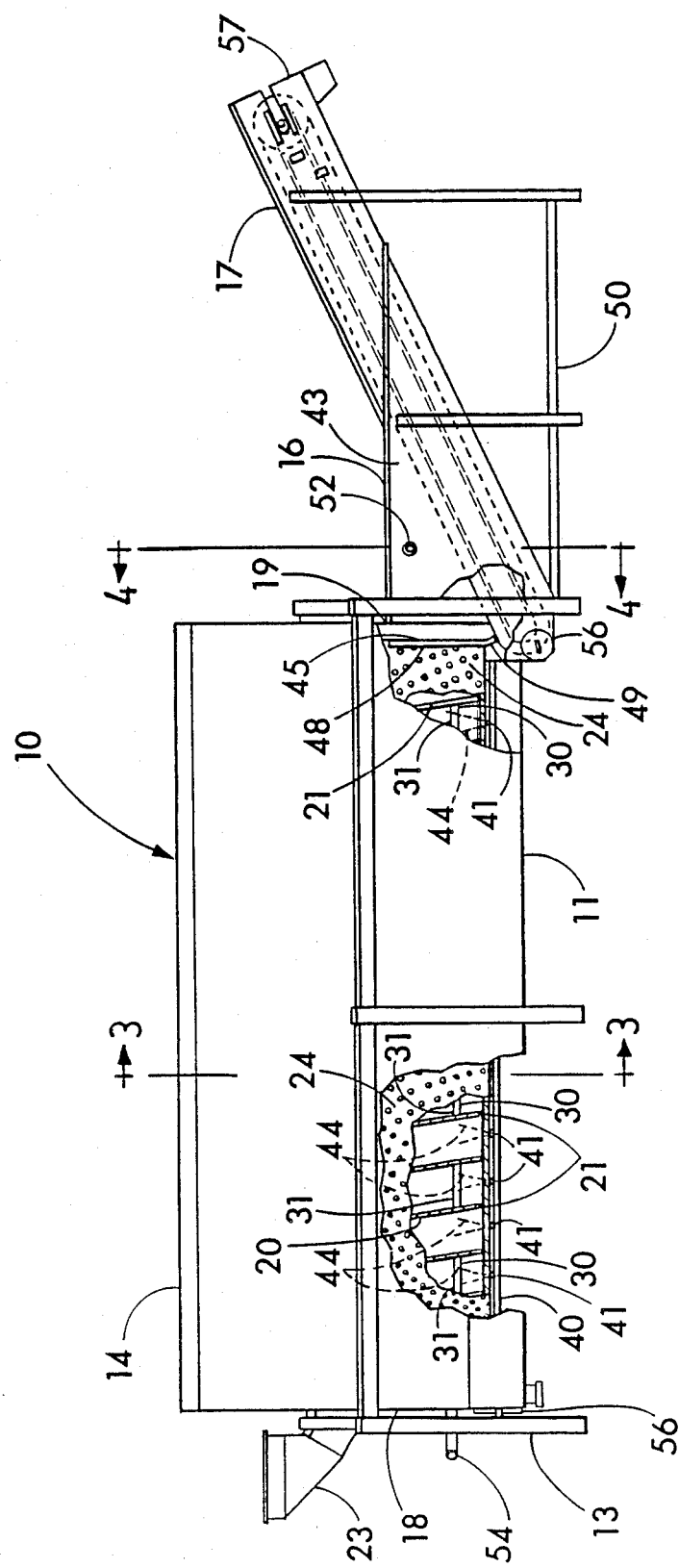
FIG. 2 is a right side elevation view of the chiller of FIG. 1, with portions of the tank cut away to expose the perforate cylinder and air manifolds, and with portions of the perforate cylinder cut away to expose the auger, baffles, and apron.
Figure 3:
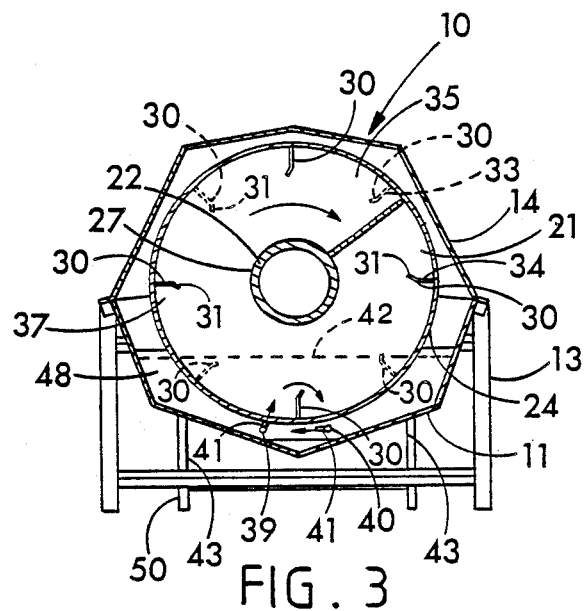
FIG. 3 is a cross-sectional view of the chiller through section line 3—3 of FIG. 2.
Figure 4:
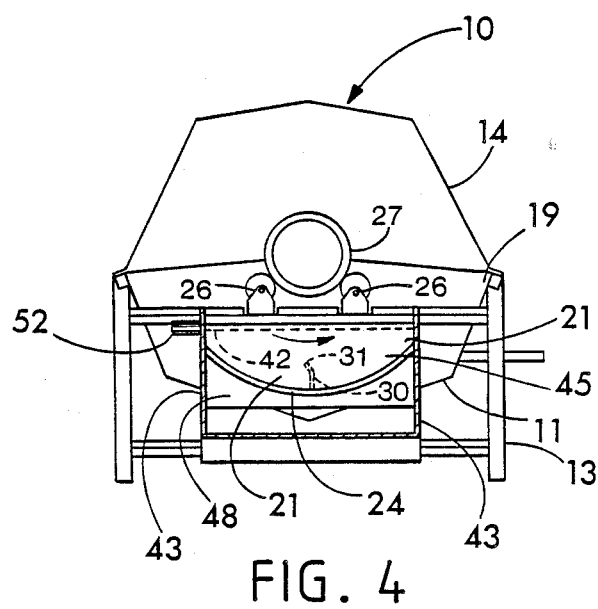
FIG. 4 is a cross-sectional view of the chiller taken along section line 4—4 of FIG. 2, with the discharge conveyor removed from the outlet tank.

As shown in FIGS. 1–3, located within the interior of the chiller 10 is a longitudinally mounted helical auger 20 which has stainless steel flights 21 wound around a central tube 22. A removable screen which forms a perforated cylinder 24 containing the food product being cooled substantially encloses the entire auger 20. Portions of the perforated cylinder 24 are cut away in FIGS. 1 and 2 to show the auger flights 21. As the auger 20 rotates, its steel flights 21 move the food product being cooled from the inlet end 18 to the discharge end 19 of the chiller. As shown in FIGS. 1 and 4, the walls of the tank 11 and cover 14 at the inlet end 18 and of the cover 14 at the discharge end 19 of the chiller 10 each form semicircular holes through which the tube journals 27 extend. Food product enters the chiller 10 through a product infeed 23 which extends through the two semicircular holes at the inlet end 18 of the chiller, which together form a circular hole when the cover 14 is down. The helical auger 20 is supported at both ends by trunions 26 which are mounted to the frame 13. The trunions 26 on each end of the machine are mounted so that they support the journals 27 at the ends of the tube 22 in a conventional manner such that the journals 27 do not make contact with walls of the tank 11 or cover 14. The vaulted cover 14 may be hingedly attached to the tank 11 so that it may be opened from either side of the chiller as disclosed in U.S. Pat. No. 4,788,476 to Zittel, the disclosure of which is hereby incorporated herein by reference. Alternatively, the vaulted cover 14 may be attached to the tank 11 in any conventional manner.

The stainless steel flights 21 of the auger 20 extend helically toward the discharge end of the chiller 10 in a counterclockwise direction as viewed from the inlet end 18. Thus when the helical auger 20 is rotated in a clockwise direction as shown in FIG. 3, the food product contained within the cylinder 24 is propelled by the auger flights toward the discharge end 19 of the chiller 10. Normally a rotating auger 20 gently pushes food product through the water within the cylinder 24 with little or no lateral movement. However, the preferred chiller 10 includes lifting baffles 30 which extend 6 inches inwardly from the screen forming the perforate cylinder 24, and which each also extend flight-to-flight between two adjacent flights 21 of the auger 20. Each baffle 30 extends radially inwardly for 5 inches, and then for the last 1 inch at the end 31 is slanted at about a 15° angle in a direction which is opposite the intended peripheral direction of rotation of the auger 20 and cylinder 24. Each baffle 30 has such a slanted end 31 so that when the baffle 30 raises the food product to the position shown at 37 in FIG. 3, the food product will fall more easily from the baffle 30 back into the water within the cylinder 24, thereby causing more agitation of the cooling water. As shown in FIG. 3, the first four baffles 30 are separated from each other by 90° as one proceeds counterclockwise around the auger 20. The fifth baffle shown in dashed lines at 33 is 45° away from the fourth baffle 34, and is behind the portion of the flight 21 shown at 35. Again, the four baffles 30 shown in dashed lines which are located rearwardly from the flight 21 shown in FIG. 3, are separated from each other by 90°. A next set of four baffles 30 toward the discharge end 19 of the chiller 10 (not shown) again will be offset from the set of baffles 30 shown in dashed lines by 45°, but will be separated from each other by 90°. Therefore as shown in FIG. 2, the baffles 30 between alternate flights 21 are aligned and the lifting load on the rotating auger 20 is evenly distributed both longitudinally and angularly. Alternatively, the baffles 30 could be placed between flights 21 in any other suitable pattern. The rotation of the solid lifting baffles 30 also agitates the water, causing the food product to come into contact with a greater proportion of the water so that there is more efficient heat exchange between the food product and water.

The perforated cylinder 24 formed by the screen has a 72 inch diameter. This fairly large diameter allows significantly more food product to be held between the flights 21 of the auger 20, when compared to a cylinder of 30 inch, 48 inch or 60 inch diameter, thereby permitting a required food cooling capacity to be achieved with a substantially shorter cylinder. The 72 inch diameter cylinder 24 has been found empirically to be the optimum size for such a cylinder. A larger cylinder would result in an increased mass of food product between the flights 21 of the auger 20. Such increased mass of food product would actually be detrimental to cooling since the free flow or egress of heat from the product would be inhibited under the operating conditions of the chiller.

As is best shown in FIGS. 2 and 3, the chiller 10 includes a first air manifold 39 and a second air manifold 40, both of which are positioned within the tank 11 under the intended water level 42 and below the cylinder 24. Each manifold 39 or 40 extends into the tank 11 along substantially the entire length of the cylinder 24, positioned parallel to the axis of the cylinder 24. As shown in FIG. 3, the first air manifold 39 is positioned relative to the cylinder axis at about 12.5° to the left side of a hypothetical vertical plane through the axis in spaced relation to the ascending side of the cylinder 24. The second air manifold 40 is positioned relative to the cylinder axis at about 12.5° to the right side of the vertical plane in spaced relation to the descending side of the cylinder. The first air manifold 39 has air nozzles 41 at first position spaced along its entire length. Each of the nozzles 41 sprays air through the water toward the cylinder 24 in a generally radial direction so that cold water lying in the lower portion of the tank 11 underneath the cylinder 24 is driven up into the cylinder to displace the water and contact the food products in the area of maximum food density within the cylinder 24. The upward sprays 44 shown in dashed lines in FIG. 2 therefore are actually behind the far side of the lifting baffles 30 shown. The second air manifold 40 also has nozzles 41 along its length in second positions below the cylinder 24. The nozzles 41 in the second air manifold 40, however, are directed toward the first manifold 39. Thus the nozzles 31 of the second manifold 40 spray air toward the first manifold 39, thereby causing warmer water which has exited the cylinder 24 to be driven toward the first manifold 39 through the colder water underneath the cylinder 24 cooling the water so driven. Thus, as shown in FIG. 3, a circulation of water is caused near the bottom of the cylinder 24 by the air sprayed from nozzles 41. Colder water which is driven by air into the cylinder 24 in turn drives out water which has become warm from the food product. The warm water which exits the cylinder 24 near its bottom then is driven through the cold water under the cylinder 24 where it is cooled and then circulated again into the cylinder 24 by the first air manifold 39.

The spraying of air by the first and second air manifolds 39 and 40 actually results in more efficient cooling of the food product. This result is particularly surprising because the air itself is much warmer than the 34° water which is usually used in a chiller. Normally the air is at room temperature. The circulation of the water between the cylinder 24 and the tank 11 under the cylinder 24 moves warmer water out of the cylinder 24 and colder water into the cylinder 24. This circulation of water between the tank 11 and cylinder 24 is particularly effective when combined with the counter-flow between food products and water, which will be described in detail below.

The outlet tank 16 has side walls 33 which are welded or otherwise joined to the discharge end of the tank 11 shown in FIGS. 2 and 4. The discharge end of the tank 11 opens into the outlet tank 16 so that the water level 42 within the outlet tank 16 is the same as that within the tank 11. Food product which has moved the entire length of the cylinder 24 is discharged from the outlet opening 45 of the cylinder 24 into the outlet tank 16. The food product drops down the apron 48 onto the baffled belt conveyor 14 at the bottom of the outlet tank 16. As shown in FIGS. 2 and 4, the apron 48 extends from the walls of the tank 11 to a position closely adjacent the sides of the rotating cylinder 24, and extends downwardly under the cylinder 24 to the conveyor 17. The apron 48 serves to prevent food product from going from the outlet tank 16 back into the tank 11 outside the cylinder 24. Water, however, passes between the tank 11 and the outlet tank 16 under the apron 48. As shown in FIG. 2, the apron bottom 49 between the outlet tank sidewalls 43 is slanted in the direction of the conveyor 17. Both the outlet tank 16 and conveyor 17 are supported by the frame 50. Clean outs 56 are located at the inlet end of the tank 11 and in the outlet tank 16 near the bottom of the conveyor 17.

Opening into an outlet tank sidewall 33 is the cold water infeed 52 through which cold water is fed into the outlet tank 16 and tank 11. At the inlet end of the tank 11 is a water discharge pipe 54 through which warmer water is discharged from the tank 11. Since colder water enters the chiller 10 at its discharge end 19, and warmer water leaves at the inlet end 18, there is actually a counter-flow within the chiller 10 between the food product and water.

In its operation, the chiller 10 efficiently chills large quantities of food product in a relatively short period of time. The normal cooling time of most chillers is about 30 minutes. In contrast, food products are cooled in about 11 minutes with the preferred chiller 10 disclosed herein. Furthermore, the length of the preferred chiller 10 will generally not be as extreme as other chillers. Chillers often have a length of about 24 feet. A preferred chiller 10 constructed according to the invention and having a length of about 12 feet generally will accomplish the same degree of cooling that a conventional 24 foot chiller will. These advantages of the preferred chiller 10 will become evident as the operation of the chiller 10 is described.

Food product enters the interior of the chiller 10 through the product infeed 23. The food product then enters the cylinder 24 through an inlet opening (not shown). Within the cylinder 24, the food product is acted upon in several different ways. First, the food product is moved generally toward the discharge end 19 of the tank 11 by the rotating flights 21 of the helical auger 20. Second, the food product and water are agitated by the rotating lifting baffles 30 which displace food product sidewardly through the water and lift food product upwardly out of the water to a point about at 37 shown in FIG. 3. As the auger 20, cylinder 24 and lifting baffles 30 continue to rotate, gravity causes the food product to slide off the lifting baffles 30 and tumble back into the water. This agitation of the water and food product causes a more efficient mixing and interfacing between the water and food product so that there is a more efficient heat exchange from a food product into the water.

Third, cold water is fed into the outlet tank 16 and tank 11 through the cold water infeed 52 into the outlet tank 16. This cold water enters the tank 11 and proceeds toward the inlet end of the tank 11, where the then warmed water is discharged through the water discharge pipe 54 at the inlet end of the tank 11. The inflow of all cold water near the discharge end of the tank 11 and the outflow of warmer water at the inlet end of the tank 11 results in an efficient counter-flow cooling process, much like that known to occur in some heat exchangers. Thus the food product is cooled gradually as it proceeds toward the discharge end 19 of the chiller 10 where it encounters the coldest water and is lowered in temperature to substantially the same temperature as the coldest water.

Fourth, the air spraying action of the first and second air manifolds 39 and 40 agitates the water within the bottom of the perforate cylinder 24 thereby continuously mixing the water and food product at the area of greatest food density within the cylinder 24 to encourage a more effective heat exchange from the food product to the water. The air induced cold water flow into the cylinder 24 substantially intersects the path of food product tumbling into the water off the baffles to help carry the food product transversely toward the descending side of the cylinder, thereby enlarging the transverse travel path of the food product within the cylinder. In addition, the cold water forced into the cylinder 24 by air from the first air manifold 39 causes the warmer water within the cylinder 24 to circulate out of the cylinder 24 into the space above the second manifold 40. The warmer water is then drawn by the action of the air sprays from the second manifold 40 through the cool water under the cylinder 24 toward the first manifold 39. This circulation is particularly effective in taking advantage of the counter-flow of the water below the cylinder 24. When the circulated water reaches the first manifold 39, the water has become quite cool.

A major portion of the colder water which moves through the tank 11 toward the inlet end 18 moves below the perforate cylinder 24. To move toward the inlet end 18 of the tank 11 through the rotating perforate cylinder 24, the colder water would have to move against the action of the flights 21 which are moving water and food product toward the discharge end 19 of the tank 11. Therefore the water between the two manifolds 39 and 40 in the lower portion of tank 11 will be particularly cold. This counter-flow is rendered more effective and advantageous by the circulation of water between the cylinder 24 and the tank 11 below the cylinder 24. The warmer water which is moved between the second and first manifolds 40 and 39 is cooled rapidly. The first air manifold 39 then directs that cold water back into the cylinder 24 where it mixes with the food product.

The 72 inch diameter of the auger 20 and perforate cylinder 24 is advantageous in that a greater amount of food product is chilled more quickly and in a shorter distance than previously. In view of this larger diameter, it is also evident that the rotating solid lifting baffles 30 move the food product across a fairly large transverse distance through the water within the cylinder 24, and then up and out of the water. Thus a greater amount of food product can be chilled to the proper temperature with a more compact chiller.

Food product which is fully cooled is discharged out the outlet opening of the perforate cylinder 24 down the apron 48 into the outlet tank 16 and onto the baffled conveyor 17 which moves the food product out of the water within the outlet tank 16 and over the discharge end 57 of the conveyor 17 where the food product can be further processed.

It is to be understood that the present invention is not limited to the particular arrangement and embodiment of parts disclosed and illustrated herein, but embraces all such modified forms thereof as come within the scope of the following claims.

What is claimed is:

1. A chiller comprising:
   (a) a tank which includes an inlet end and a discharge end;
   (b) a perforate cylinder mounted rotatably within the tank so that water contained in the tank will enter the cylinder, the cylinder having an inlet opening near the inlet end of the tank for receiving introduced food product and an outlet opening near the discharge end of the tank where food product which has moved through the cylinder can be discharged therefrom;
   (c) an auger positioned substantially within the perforate cylinder to rotate with the cylinder, the auger having flights of diameter about equal to that of the cylinder which drive the food product toward the cylinder outlet opening; and
   (d) a plurality of lifting baffles, each of which extends substantially radially inwardly from the perforate cylinder and between two adjacent flights of the auger, so that when the auger and cylinder rotate, the baffles carry the food product sidewardly and lift the food product upwardly out of the water, and then allow the food product to tumble back into the water.

2. The chiller specified in claim 1 wherein an inward end of each baffle is slanted toward a direction which is opposite to the peripheral direction of rotation of the auger and cylinder.

3. The chiller specified in claim 1 wherein the cylinder and auger have a diameter of about 72 inches.

4. The chiller specified in claim 1 further having a cold water infeed near the tank discharge end, and a water discharge at the inlet end of the tank.

5. A chiller comprising;
   (a) a tank with an inlet end and a discharge end;
   (b) an auger having flights mounted rotatably within the tank;
   (c) a perforate cylinder mounted within the tank around the auger to substantially contain the auger and food product while allowing water within the tank to pass in and out of the perforate cylinder, the cylinder having an inlet opening near the inlet end of the tank for receiving introduced food product and an outlet opening near the discharge end of the tank, the flights of the rotating auger driving food product through the cylinder and out the outlet opening;
   (d) a first air manifold mounted within the tank below an intended water level outside the cylinder along substantially its entire length, the first air manifold having orifices through which air is directed toward the perforate cylinder so that colder water within the tank outside the cylinder is driven into the cylinder and mixed with the food product therein; and
   (e) a second air manifold also mounted within the tank below the intended water level outside the cylinder along substantially its entire length and in spaced relation to the first air manifold, the second air manifold having orifices through which air is directed toward the first air manifold so that warmer water which has exited the cylinder is cooled by being driven toward the first manifold through colder water in the tank, the first and second manifolds thereby causing an agitation of water within the cylinder and a circulation of water between the tank and cylinder so that cold water is constantly being directed into the cylinder.

6. The chiller specified in claim 5 wherein the first manifold is substantially parallel to an axis of the cylinder, the first manifold being positioned in spaced relation to the ascending side of the cylinder near the bottom of the cylinder.

7. The chiller specified in claim 5 wherein the second manifold is substantially parallel to an axis of the cylinder, the second manifold being positioned in spaced relation to the descending side of the cylinder near the bottom of the cylinder.

8. The chiller specified in claim 5 wherein the cylinder and auger have a diameter of about 72 inches.

9. The chiller specified in claim 5 further having a cold water infeed near the discharge end of the tank, and a water discharge at the inlet end of the tank.

10. A chiller comprising:
 (a) a tank which includes an inlet end and a discharge end;
 (b) a perforate cylinder mounted rotatably within the tank so that water contained in the tank will enter the cylinder, the cylinder having an inlet opening near the inlet end of the tank for receiving introduced food product and an outlet opening near the discharge end of the tank where food product which has moved through the cylinder can be discharged therefrom;
 (c) an auger positioned substantially within the perforate cylinder to rotate with the cylinder, the auger having flights of diameter about equal to that of the cylinder which drive the food product toward the cylinder outlet opening; and
 (d) a plurality of lifting baffles, each of which extends substantially radially inwardly from the perforate cylinder and between two adjacent flights of the auger, so that when the auger and cylinder rotate, the baffles carry the food product sidewardly and lift the food product upwardly out of the water, and then allow the food product to tumble back into the water.
 (e) a first air manifold mounted within the tank below an intended water level outside the cylinder along substantially its entire length, the first air manifold having orifices through which air is directed toward the perforate cylinder so that colder water within the tank outside the cylinder is driven into the cylinder and mixed with the food product therein; and
 (f) a second air manifold also mounted within the tank below the intended water level outside the cylinder along substantially its entire length and in spaced relation to the first air manifold, the second air manifold having orifices through which air is directed toward the first air manifold so that warmer water which has exited the cylinder is cooled by being driven toward the first manifold through colder water in the tank, the first and second manifolds thereby causing an agitation of water within the cylinder and a circulation of water between the tank and cylinder so that cold water is constantly being directed into the cylinder.

11. The chiller specified in claim 10 wherein the first manifold is substantially parallel to an axis of the cylinder, the first manifold being positioned in spaced relation to the ascending side of the cylinder near the bottom of the cylinder.

12. The chiller specified in claim 10 wherein the second manifold is substantially parallel to an axis of the cylinder, the second manifold being positioned in spaced relation to the descending side of the cylinder near the bottom of the cylinder.

13. The chiller specified in claim 10 wherein the cylinder and auger have a diameter of about 72 inches.

14. The chiller specified in claim 10 further having a cold water infeed near the discharge end of the tank, and a water discharge at the inlet end of the tank.

* * * * *